Oct. 11, 1955  T. A. LANCASTER  2,720,477
PLASTIC BANDAGE OR ADHESIVE TAPE AND PROCESS OF MANUFACTURE
Filed April 30, 1953
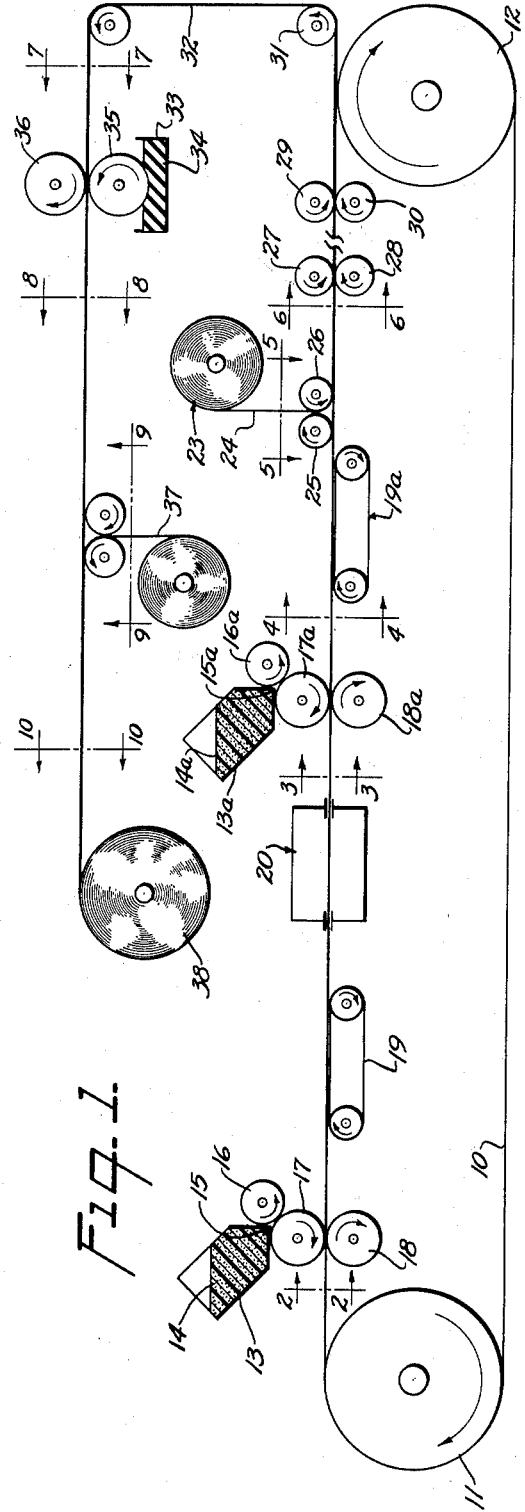
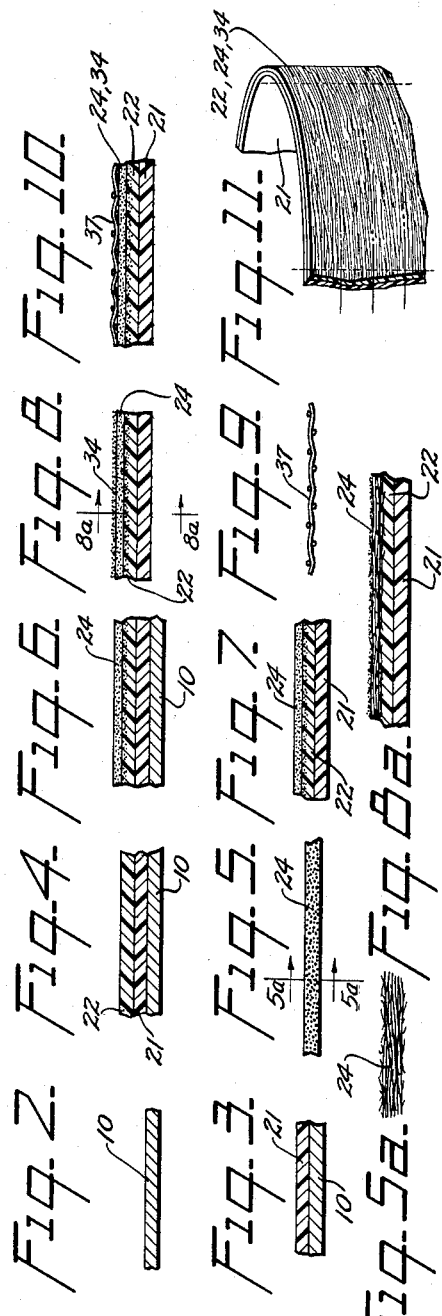
INVENTOR.
TALBOT A. LANCASTER
BY John J. Rogan
ATTORNEY.

United States Patent Office 2,720,477
Patented Oct. 11, 1955

2,720,477

PLASTIC BANDAGE OR ADHESIVE TAPE AND PROCESS OF MANUFACTURE

Talbot A. Lancaster, Canterbury, Conn., assignor to Plastic Film Corporation, Plainfield, Conn., a corporation of Delaware Application April 30, 1953, Serial No. 352,075

18 Claims. (Cl. 154—53.5)

This invention relates to the manufacture of adhesive bandages or tapes, and more particularly it relates to such bandages or tapes having a body portion of a plastic film.

A principal object of the invention is to provide an improved plastic bandage or adhesive tape.

Another object is to provide a more reliable and economic process for manufacturing plastic bandages or tapes.

Another object is to provide a plastic bandage or tape having substantial stretchability mainly in one direction.

Heretofore the known adhesive plastic bandage or tape has been formed from a thermoplastic film which by its very nature has substantial stretchability in all directions since it is rubber-like. Furthermore, this stretchability is greatly affected by any heat treatments to which the plastic may eventually be subjected, for example the usual sterilizing methods which require heating to 250° F. for a considerable period. In the prior known method the plastic is cast as a strippable film on a longitudinally moving backing or carrier. Therefore, if any subsequent operations are to be performed on the plastic material, such as applying adhesive coating, sterilizing, reeling under tension, and the like, it has not been found practical to employ conventional calender type coating, rolling and sterilizing machines.

Therefore, another object of the invention is to provide a novel plastic bandage or tape material and process of manufacture thereof, whereby after the film is stripped from its carrier it can be subjected to such operations as coating, sterilizing, reeling, and the like, while employing conventional calender type machines and techniques for those purposes. This greatly simplifies the manufacturing process and reduces the manufacturing cost. Additionally, it permits the finished material to be produced with the desired stretchability confined to a particular direction. For example, in the case of adhesive tapes, it is highly desirable that the tape have substantially negligible stretchability in the direction of its length. In the case of adhesive bandage, it is desirable that a pronounced stretchability be present in a certain direction. This direction can be chosen by the direction of coating of the finished material with respect to the length of the fibrous constituents as hereinafter described.

By the present invention, therefore, the same mechanism and process steps can be used for the manufacture of both adhesive tapes and adhesive bandages, and the desired direction of stretch in the finished product is determined by a final cutting operation either in the direction of the length of the web formation or transversely thereto.

A feature of the invention relates to a bandage or tape composed of a main body of plastic sheeting or strip, one face of which has bonded permanently thereto a fibrous material having substantial stretchability mainly in only one direction. This enables a more uniform attachment of adhesive material by providing an interlock between the fibres and the adhesive, and may obviate the necessity of applying a special primer or tie coat to the plastic film before applying the adhesive.

Heretofore the known plastic adhesive tape has pronounced stretchability in all directions and therefore is very difficult to tear cross-wise by hand, in fact it may require the packing of the tape in a special device or holder having a cutting edge extending across the width of the tape. Accordingly, it is another feature of this invention to provide an improved plastic adhesive tape which can be easily and cleanly torn by hand across its width without requiring any special tearing devices for that purpose.

A further feature relates to the novel organization, arrangement and relative location and constitution of parts which cooperate to provide an improved plastic adhesive bandage or sheet.

Other features and advantages not specifically enumerated will be apparent after a consideration of the following detailed descriptions and the appended claims.

In the drawing,

Fig. 1 shows one typical organization of apparatus for practising the process, and for producing the product according to the invention.

Figs. 2 to 10 are respective cross-sections of Fig. 1 taken along the respective section identification lines of that figure.

Fig. 5a is a magnified section on line 5a—5a of Fig. 5.

Fig. 8a is a magnified section on line 8a—8a of Fig. 8.

Fig. 11 is a part sectional and perspective view of the material according to the invention, illustrating how it can be cut for the desired direction of stretchability.

There has been on the market for some time a so-called plastic bandage, which usually consists of a thin stretchable plastic film to one side of which there has been applied a suitable pressure-sensitive adhesive of the type commonly used in adhesive tapes, and over which there may be applied a protective sterile gauze or pad. Because of the inherent dimensional instability of such plastic films when subjected to heat or mechanical processing such as calendering or the like, a number of problems arise. For example, if the adhesive material is applied by calendering rolls, the film has so much inherent stretch in all directions that it is well-nigh impossible to cause the adhesive material to release uniformly from the calender roll without distorting the film beyond the limits of usability. On the other hand, if the adhesive material is applied from solutions by conventional coating devices, it is necessary to remove the solvent of the coating material by applying heat and air circulation. Even then it becomes difficult, if not impossible, to carry out the coating as a continuous operation because the volatilizing temperature used to dry out the solvents, result in softening of the film to such an extent that it cannot be pulled through the usual drying ovens without additional support. Consequently the usual method, whereby such bandages are made, requires the supporting of the thin stretchable plastic film on a separate carrier or backing, usually of paper at the stage where the adhesive is applied and at subsequent stages such as rolling, sterilizing, etc. The adhesive material is applied to the film while the latter is attached to the backing, and then the assembly is moved through the drying ovens. Finally the adhesive coated plastic film must be removed or stripped from the paper backing, and stripped film with its adhesive must be interleaved with a suitable releasing sheet to which the adhesive is poorly adherent, before the tape can be wound into a roll.

Furthermore, in the prior known method, if any stretch is purposely or accidentally imparted to the plastic during the initial or intermediate stages of its manufacture, that stretch may be substantially changed during subsequent stages such as sterilization heating, resulting in uncontrolled dimensional distortion in the final product.

Since the plastic film materials that are used have very smooth surfaces it is in some cases necessary to pre-treat one side of the plastic film with a special coating compound, commonly called a primer coat or tie coat for the adhesive. The present invention provides a novel composite adhesive tape or bandage material which avoids the necessity of employing a primer or tie coat on the film.

The novel product according to the invention comprises a fibrous material such for example as paper, linen, cotton, synthetic fibers, and the like, in which the fibers are oriented so as to have their lengths extending in the same general direction. The fibres are preferably hair-like and are bonded together either mechanically, as for example by compression, or by a suitable chemical bonding material, such for example as polyvinyl acetate-chloride co-polymers or polyvinyl alcohol. Thus, in the case of paper any of the well-known processes and machines may be used, for example of the cylinder type, as distinguished from the Fourdrinier type. As the paper pulp leaves the cylinder the fibres are automatically oriented in substantially the same general direction. Such papers are well-known in the art and are usually referred to as cylinder machine papers. Similarly in the case of linen or cotton materials the material may be prepared as follows: either on modified paper making machinery as above, and/or on textile preparatory equipment such as opening and picking machines and either conventional or modified cards; if textile equipment, such as cards, is employed, the web would be drawn off the card in full width rather than in the usual rope form which is commonly referred to as a card sliver.

Such fibrous sheets have little or no stretchability in the direction in which the fibres are oriented, but do possess substantial stretchability in a direction at right angles to the direction of fibre orientation. The degree of this latter stretchability can be controlled by the degree of bonding between the fibres, or by the addition of binders to increase the tenacity of such fibres to one another. Mechanical treatment, such as calendering, can also be employed to vary the degree of bonding. Such fibrous material is of pronounced porosity and softness, and while the fibres all lie in the same general direction the surface is not perfectly smooth and in some cases some of the fibre ends may project laterally beyond the general level of the material as shown in the greatly magnified view of Fig. 5a. For that reason it is preferred to employ a special two-pass process for forming the plastic film as will be described hereinbelow.

In accordance with the invention this unidirectionally oriented fibrous material is permanently bonded to a stretchable plastic film. This film may be of any well-known plastic film-forming resin or combination of resins, or elastomers, of which the well-known thermoplastic resins of which polyvinyl chloride, polyvinyl acetate, polyvinylidene chloride are typical. Preferably, and as above mentioned, the plastic film is formed in two passes. The first pass is allowed to harden before the second pass is applied thereto. While the second pass is still soft or semi-liquid it has laid thereon a sheet of the above-mentioned unidirectionally oriented fibrous material. By this procedure there are no surface irregularities or protruding fibers on one side of the film, since the fibers are anchored in the second pass and cannot extend through the first pass which has been previously hardened. The net result at this stage of the process is a plastic-fibrous product one surface of which is completely smooth and waterproof consisting entirely of plastic, and the opposite surface of which is a composite of plastic and the oriented fibrous material. The formation of the composite side is such that it has what may be called a somewhat linty appearance, because the fibres while being bonded to the plastic are nevertheless not completely embedded in the plastic. However, the composite product consists mainly of thermoplastic film which, to the touch, feels like a smooth surface plastic which has the pliability and surface smoothness of conventional thermoplastic films. It is clearly distinguishable both as to appearance, touch and selective stretchability from cloth or fabric which has been merely coated with plastic. This composite side, therefore, provides a highly efficient bonding surface for the pressure sensitive adhesive which is applied thereto.

Because of the nature of the composite surface, and because of the uni-directional stretch properties of the sheet, it is possible to apply the said adhesive mass either by calendering, or by any of the usual coating techniques, without the necessity of supporting the sheet on an additional carrier. The adhesive mass can be applied directly to the composite surface of the infibrillated plastic thus obviating the need for a separate tie or primer coat on the plastic film. Since the plastic film has not at any time during its deposition been subjected to stretching forces, it retains its original inherent stretchability in the direction transverse to the fiber lengths, even when it is subsequently subjected to relatively high temperatures such as sterilizing temperatures and the like.

Furthermore, because the material has substantially negligible stretch in the direction of its formation or feeding, that is in the direction of movement of the carrier and the direction of rotation of the various rollers, it is not necessary to interleave it with a so-called releasing sheet at the time the film with its adhesive coat is being wound into a reel. It is well known that in such reeling operations it is necessary to subject the material to a substantial tensioning force which may tend to distort the conventional plastic film in an absence of an interleaving or backing sheet.

The resultant material, according to the invention, since it possesses inherent resistance to stretch in the direction of the length of formation, can be fed to any conventional bandage-forming, tape cutting, or sterilizing machine without any danger of distorting it dimensionally. Furthermore, it is possible to cut from the finished material an adhesive tape having substantially no stretchability in the direction of the tape length; or a bandage having stretchability in a predetermined direction, namely transverse to the length of the fibrous constituents.

Referring to the drawing, the numeral 10 represents an endless belt or carrier of a smooth-surface material such, for example, as highly calendered paper, stainless steel and the like, on which the plastic film can be cast and dried without a permanent adhesive affinity therewith, and so that the film can be readily stripped or peeled from the carrier. The carrier 10 passes around suitable rollers 11, 12, for movement in the direction of the arrows. Adjacent the right-hand end of the carrier is mounted a reservoir or box 13 containing a supply of film-forming plastic 14 in liquid condition. The reservoir has an elongated narrow exit slit for the plastic to allow it to flow into the trough formed between the rollers 16, 17, rotating as indicated. A backing roller 18 is provided and the carrier 10 moves between the backing roller and the coating roller 17. The thickness of the plastic film coating can be regulated or metered in any well known manner, and may be of from .0005 to .012 inch thick. It will be understood that any conventional belt driving means may be used to move the carrier at a predetermined uniform speed, this driving means being schematically indicated in the drawing by the units 18, 19.

The coated carrier is then passed through a heating oven 20 to drive off the solvents or diluents and other volatile agents in the plastic coat which emerges from the oven as a dry plastic film 21, as indicated in cross-section in Fig. 3. The dried plastic film attached to the carrier 10 then moves past another film coating unit comprising, for example, the elements 13a—18a similar to the elements 13—18 of the first coating unit, whereby the second pass or layer 22 (Fig. 4) of plastic film is applied to the first dried pass 21. This second pass, being of the same character as the first pass, is compatible therewith, and when it is subsequently dried it forms with the first pass a unitary double-stratum or two-pass plastic film. The overall thickness of both films may be from .001 to .020 inch.

Before the second pass 22 is dry and while it is still relatively soft and tacky, it moves past the infibrillating unit consisting of a supply roll 23 of the above described fibrous material 24 wherein substantially all the individual fibres are oriented in a direction substantially parallel to the length of the sheet and therefore parallel to the direction of movement of the carrier 10. In this connection, see Figs. 5a and 8a. This unidirectionally oriented fibrous sheet passes between suitable guide and draw-off rolls 25, 26, whereby the fibrous sheet is brought into relatively light pressure contact with the soft film pass 22. At this stage, it is preferable not to exert any substantial pressure because to do so might cause the fibre ends to distort the extremely thin first pass 21 or destroy its desired external smoothness. The desired light pressure may be provided by suitable rolls 27, 28, 29, 30, whereby the thickness of the fibrous sheet is only partially embedded in pass 22 as shown in the greatly magnified view of Fig. 8a. In other words, the fibrous sheet imparts a fibrous appearance and character to the upper surface of pass 22. If desired, the assembly can then be moved through suitable driers to harden the second pass 22 with its fibrous surface. The dried composite sheet is then stripped from the carrier by being passed around rollers 31, 32.

The dried composite sheet is then moved past a suitable adhesive applying unit comprising, for example, the tank 33 containing in liquid form any well known adhesive 34 of the pressure sensitive kind. This adhesive is transferred by the calender roll 35 to the infibrillated side of the composite sheet. A suitable backing roll 36 presses against the smooth side of the said sheet. It has been found that because of the fibrous surface and because the composite sheet is inhibited against stretch in the direction of its movement, it is possible to apply the adhesive uniformly by the roller method and without causing any distortion of the composite sheet as it is being pulled away from the roll 35.

The adhesive-bearing composite sheet can then be processed in any well known bandage forming and sterilizing machine to apply a sterile protective gauze 37 to the adhesive side, which gauze is readily strippable without impairing the adhesive properties of the plastic bandage. Notwithstanding that the sterilization is usually carried out at temperatures of as much as 250° F. for a substantial period of time, the composite material according to the invention retains its original dimensional stability, even though the plastic film has in the meanwhile been stripped from its carrier on which it was originally formed. The completed assembly can then be wound directly on the roll 38 without interposing a separate releasing sheet between the successive turns. The completed bandage sheet can be unrolled to any desired length from the roll, and, by means of any well known cutting mechanism, the sheet can be cut in the desired direction, depending upon which direction of stretch is required for the final bandage or tape. Thus, if the sheet from roll 38 is cut in relatively narrow strips in the direction of the sheet length, namely in the direction of orientation of the fibres, as indicated by the horizontal dot-dash lines (Fig. 11), there will be very little stretch in that direction, but there will be pronounced stretch in a direction at right angles thereto. By cutting the composite sheet in wider strips, as for example between the vertical dotted lines (Fig. 11), namely transverse to the direction of orientation of the fibres, a bandage sheet of the desired direction of stretch is produced. One of the additional important advantages of the adhesive tapes made according to the present invention is that the tape has relatively little stretch in the direction of its length.

Heretofore where plastic adhesive tapes have been made it has been necessary to advise the user that because of the elasticity of the tape in the direction of its length it should not be applied tightly around limbs, fingers, or toes. By confining the stretch to the narrow width of the tape that objection to plastic adhesive tapes is substantially obviated. In other words, the fibres substantially prevent the plastic being stretched in the direction of orientation of the said fibres, but the plastic retains its inherent stretchability in the direction at right angles to the fibre orientation.

Various changes and modifications can be made in the apparatus and materials disclosed without departing from the spirit and scope of the invention.

What is claimed is:

1. The method of making an infibrillated plastic adhesive web which comprises forming on a strippable carrier a viscous plastic film, permanently bonding under limited pressure to one side of said plastic film while still viscous a layer of fibrous material with the fibres interlocked and bonded in unthreaded form and oriented in substantially the same general direction, limiting said pressure to cause said fibers to be partially imbedded in said film while leaving an exposed fibrous surface and covering substantially the entire film on said side, drying said viscous film to solidify it and then applying an adhesive to said exposed fibrous surface.

2. The method of making an infibrillated plastic web which comprises, feeding and forming in one continuous direction a thermoplastic film with a viscous surface, contacting one side of said film while it is still in a viscous condition with a layer of fibrous material whose fibers are compacted but unthreaded and are oriented in the said one direction, subjecting said film and fibrous material to limited pressure whereby the film remains unperforated by said fibers while being infibrillated thereby on one side only and without substantial distortion of the opposite side of said film, solidying said infibrillated film, and then stripping the infibrillated film from said carrier.

3. The method of making an infibrillated thermoplastic film from a plastic which plastic in the non-infibrillated condition has substantial stretchability in two directions which comprises, forming and feeding the film in an unstretched and viscous condition in one continuous direction, and limiting the stretchability of the finished plastic film to said one direction by permanently bonding to only one face of said film while it is still in a viscous condition an exposed layer of fibrous material consisting of compacted free-ended discontinuous fibrous elements which are oriented in the said direction of film formation, and being bonded together without threading, and drying said viscous film to form a permanent unit with said fibrous material.

4. The method according to claim 3 in which the plastic film is formed by depositing it in a continuous operation on a strippable carrier, and the infibrillated film is solidified while on the carrier to substantially completely cover said film, and then the fibrous surface thereof is subsequently coated directly with adhesive material.

5. The method according to claim 3 in which the plastic film is deposited in a continuous operation on a strippable carrier and the infibrillated plastic film is solidified while on said carrier and provided with a tie coat, and then a pressure sensitive adhesive is applied to said tie coat.

6. The method according to claim 3, in which the adhesive is applied to the fibrous side of the composite material and the said fibrous side is coated with said adhesive by a calendering operation whereby said composite material with the adhesive coat can be stripped from the calender roll without distortion of the film and without destroying the continuity of the adhesive coat.

7. The method according to claim 3 in which the infibrillated plastic is solidified on said carrier, and is then stripped therefrom after which said adhesive material is applied to said fibrous surface.

8. The method according to claim 7, in which the adhesive is applied to said fibrous surface without strippably attaching the infibrillated plastic to a separate carrier.

9. The method which comprises, forming on a strippable carrier a plastic film in two successive passes, drying the first pass to solidify it, then applying the second pass in viscous condition, and infibrillating the second pass only and while it is still in a viscous condition with a compacted but non-woven fibrous material having the fibrous elements arranged in the same general direction and bonded together without threading to inhibit stretchability of the film in one predetermined direction and to provide an exposed fibrous surface to which adhesive can be applied.

10. The method of making an adhesive bandage material and the like which comprises, infibrillating only one surface of a thin thermoplastic film with a non-woven compacted fibrous paper material having the fibers compacted without threading oriented in substantially only one general direction to inhibit stretchability of the film in that direction said fibrous paper material substantially entirely covering said film, and applying a pressure-sensitive adhesive to said infibrillated surface.

11. The method of making an adhesive bandage material which comprises, forming a thin plastic film in a plurality of separate passes, allowing the bottom pass to harden before applying the top pass, applying to said top pass while it is still tacky a layer of fibrous material having the fibres compacted without threading and oriented substantially in the same general direction, pressing said fibrous material so that it becomes partially imbedded only in said top pass, while substantially completely covering said top pass, drying said tacky layer, and then applying adhesive directly to said fibrous material.

12. The method of making an adhesive strip which comprises, forming a thermoplastic film in successive passes, allowing one pass to harden before applying the next pass, bonding to said next pass while it is still viscous a layer of fibrous material with the fibres lightly compacted and interlocked without threading and oriented in one general direction only to inhibit stretchability of the film in a desired direction, and cutting said film into strips correlated with the said orientation of the said fibres.

13. A new article of manufacture, comprising a film of plastic which is normally readily extensible in all directions, said film having at least one surface infibrillated with a fibrous material imbedded only partially into the thickness of said film, said fibrous material having hair-like fibres lightly compacted in unthreaded form and oriented substantially in one general direction to inhibit stretchability of said film in said direction, without correspondingly increasing the tearability in the transverse direction.

14. A new article of manufacture, comprising a film of plastic having one surface infibrillated with a fibrous material constituted of non-woven but lightly compacted and bonded hair-like fibres in unthreaded form and oriented in the same general direction to inhibit stretchability of the film in that direction while permitting ready stretchability in a direction at right angles thereto, said fibrous material being imbedded only to a limited extent into the thickness of said film but covering substantially the entire surface thereof.

15. A new article of manufacture, comprising in combination, a double stratum but unitary film of film-forming resin, the upper one of said strata alone having its exposed surface infibrillated with bonded hair-like fibres in unthreaded form all oriented in the same general direction to inhibit stretchability of the film in that direction, said fibres being partially embedded in only the said upper stratum, and substantially entirely covering said upper stratum.

16. An adhesive bandage material, comprising a web of thin plastic film having only one side infibrillated with compacted non-woven and non-threaded fibres extending in the same general direction to inhibit stretchability of the film in that direction while covering substantially the entire surface of said one side of the film, and a pressure-sensitive adhesive directly coated on to said infibrillated surface.

17. An adhesive bandage material having substantial stretchability in only one predetermined direction, comprising a web of thin plastic film having normally a substantial stretchability in mutually perpendicular directions, a layer of fibrous material permanently bonded to one surface of said strip and with the fibre lengths oriented in a direction substantially transverse to said desired direction of stretchability, said fibrous material being constituted of lightly compacted hair-like but non-threaded fibres.

18. A pressure-sensitive adhesive tape comprising, a strip of thin thermoplastic film which film normally has substantial stretchability in mutually perpendicular directions, a layer of compacted but non-woven fibrous material permanently bonded to one surface of said strip and with the fiber lengths oriented in the direction of the tape length whereby said tape has negligible stretchability in a direction of its length but is readily tearable by hand across its width, said fibrous material being constituted of lightly compacted hair-like but non-threaded and discontinuous fibres.

References Cited in the file of this patent

UNITED STATES PATENTS

| Number | Name | Date |
|---|---|---|
| 2,283,202 | Guyard | May 19, 1942 |
| 2,604,424 | Mathes | July 22, 1952 |
| 2,618,580 | Lancaster | Nov. 18, 1952 |
| 2,631,957 | Francis | Mar. 17, 1953 |
| 2,657,157 | Francis | Oct. 27, 1953 |